United States Patent
Chen et al.

(10) Patent No.: US 12,120,203 B2
(45) Date of Patent: Oct. 15, 2024

(54) UDP MESSAGE DISTRIBUTION METHOD, UDP MESSAGE DISTRIBUTION APPARATUS, ELECTRONIC DEVICE AND COMPUTER READABLE STORAGE MEDIUM

(71) Applicant: WANGSU SCIENCE & TECHNOLOGY CO., LTD., Shanghai (CN)

(72) Inventors: Xiangxiang Chen, Shanghai (CN); Xiaochuan Zhuang, Shanghai (CN)

(73) Assignee: WANGSU SCIENCE AND TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 18/506,048

(22) Filed: Nov. 9, 2023

(65) Prior Publication Data
US 2024/0089352 A1 Mar. 14, 2024

Related U.S. Application Data

(63) Continuation of application No. PCT/CN2023/094581, filed on May 16, 2023.

(30) Foreign Application Priority Data
May 20, 2022 (CN) .......................... 202210556806.3

(51) Int. Cl.
*H04L 69/164* (2022.01)
*H04L 69/167* (2022.01)

(52) U.S. Cl.
CPC .......... *H04L 69/164* (2013.01); *H04L 69/167* (2013.01)

(58) Field of Classification Search
CPC .. H04L 63/0236; H04L 69/161; H04L 69/164
See application file for complete search history.

(56) References Cited

U.S. PATENT DOCUMENTS 10,417,014 B2 * 9/2019 Chen .................... G06F 9/44521
10,742,557 B1 * 8/2020 Miryala ................. H04L 49/70
(Continued)

FOREIGN PATENT DOCUMENTS

| CN | 1734997 A | 2/2006 |
|----|-----------|--------|
| CN | 102508713 A | 6/2012 |

(Continued)

OTHER PUBLICATIONS

Sitnicki, J., "It's Crowded in here", printed from blog.cloudflare.com on Apr. 2024, published Oct. 12, 2019 (Year: 2019).*

(Continued)

*Primary Examiner* — David R Lazaro
(74) *Attorney, Agent, or Firm* — USCH Law, PC

(57) ABSTRACT

In response to there being multiple process groups for one application service concurrently, each of the multiple process groups has an independent EBPF resource, and the EBPF resource is used to store information of an FD of each process in each of the multiple process groups. After a UDP message is received, a server is configured to determine a target process group from multiple process groups of a reuseport group according to a quadruple of the UDP message, select a target FD from the FD of each process of the target process group, and receive and transmit data by using the target FD. In this way, since each of the multiple process groups has an independent EBPF resource, the processes belong to different process groups do not preempt the same FD, which ensures that the UDP message is not distributed in disorder.

20 Claims, 3 Drawing Sheets

(56) References Cited

U.S. PATENT DOCUMENTS

| | | | |
|---|---|---|---|
| 11,314,614 B2* | 4/2022 | Porras | H04L 63/1425 |
| 2018/0217852 A1* | 8/2018 | Chen | G06F 9/547 |
| 2021/0211408 A1* | 7/2021 | Porras | G06F 11/3409 |
| 2023/0198964 A1* | 6/2023 | Viswambharan | H04L 63/0435 |
| | | | 713/168 |
| 2024/0089352 A1* | 3/2024 | Chen | H04L 69/167 |

FOREIGN PATENT DOCUMENTS

| | | |
|---|---|---|
| CN | 113132356 A | 7/2021 |
| CN | 113138836 A | 7/2021 |
| CN | 113630439 A | 11/2021 |
| CN | 113746930 A | 12/2021 |
| CN | 113765867 A | 12/2021 |
| CN | 114006839 A | 2/2022 |
| CN | 115118791 A | 9/2022 |
| EP | 1515513 A1 | 3/2005 |
| WO | 2020015838 A1 | 1/2020 |
| WO | 2021252004 A1 | 12/2021 |

OTHER PUBLICATIONS

Xianli Ni, TCP/IP protocol and port number application, No. 4 Financial computer of huanan., Apr. 10, 2003, 5 pgs.

* cited by examiner ium," filed May 16, 2023, which claims priority to
UDP MESSAGE DISTRIBUTION METHOD, UDP MESSAGE DISTRIBUTION APPARATUS, ELECTRONIC DEVICE AND COMPUTER READABLE STORAGE MEDIUM

CROSS REFERENCE TO RELATED APPLICATIONS

The present application is a continuation of PCT Patent Application No. PCT/CN2023/094581, entitled "UDP MESSAGE DISTRIBUTION METHOD, UDP MESSAGE DISTRIBUTION APPARATUS AND READABLE STORAGE MEDChinese Patent Application No. CN202210556806.3, entitled "UDP MESSAGE DISTRIBUTION METHOD, UDP MESSAGE DISTRIBUTION APPARATUS AND READABLE STORAGE MEDIUM," filed on May 20, 2022, each of which is incorporated by reference herein in its entirety.

TECHNICAL FIELD

Embodiments of the present application relate to the technical field of the Internet, in particular to a UDP message distribution method, a UDP message distribution apparatus, an electronic device and a computer readable storage medium.

BACKGROUND

A user datagram protocol (UDP) is a connectionless transport layer protocol in an open system interconnect (OSI) reference model. With the development of technologies, more and more streaming media protocols are implemented based on the UDP.

The streaming media protocols implemented based on the UDP include a secure reliable transport (SRT) protocol, a web real-time communication (WEBRTC) protocol, a quick UDP Internet connections (QUIC) protocol, and the like. Compared with a transmission control protocol (TCP), the UDP has no concept of connection, so that the UDP is fast but less reliable.

A Nginx server is a high-performance hypertext transfer protocol (HTTP) and a reverse proxy server, which has the characteristics of high concurrency, high performance, less memory occupation and the like. A Nginx-based streaming media server has been widely applied in the streaming technology. The Nginx server is configured to deploy multiple application services that can run concurrently. Each of the multiple application services corresponds to a group of processes, which includes multiple processes. Data is received and transmitted with the same UDP port over one group of processes.

However, it has been found in verification that in response to the application services being subjected to upgrade or hot update, it is possible for two or more groups of processes to exist. In this way, the problem of data disorder is caused by the fact that data is received and transmitted with the same UDP port over multiple groups of processes. For example, there are two distinct groups of processes, one being an old process group and the other being a new process group, respectively. Subsequently, a UDP message originally distributed by processes in the new process group is distributed to processes in the old process group, or a UDP message is initially distributed to processes in the old process group, but distributed to processes in the new process group.

SUMMARY

A UDP message distribution method, a UDP message distribution apparatus, an electronic device and a computer readable storage medium are provided according to the present application. Each time a new process group is created, an extend Berkeley packet filter (EBPF) resource is distributed to the new process group, so that each of multiple process groups has the independent ebpf resource, which ensures that UDP messages are not distributed in disorder in response to the multiple process groups existing concurrently, and thus, fulfilling the purpose of improving the service quality.

In a first aspect, a UDP message distribution method is provided according to an embodiment of the present application, and the UDP message distribution method includes:
receiving a UDP message from a terminal device;
determining a target process group from multiple process groups of a reuseport group according to a quadruple carried by the UDP message, where the multiple process groups are created in a sequence for an application service, and each of the multiple process groups has an EBPF resource independent from each other;
selecting a target file handle (FD) from FDs of multiple processes of the target process group; and
distributing, by the target FD, the UDP message.

In a second aspect, a UDP message distribution apparatus is provided according to an embodiment of the present application, and the UDP message distribution apparatus includes:
a transceiving module configured to receive a UDP message from a terminal device;
a processing module configured to determine a target process group from multiple process groups of a reuseport group according to a quadruple carried by the UDP message, wherein the multiple process groups are created in a sequence for an application service, and each of the multiple process groups has an EBPF resource independent from each other;
a selecting module configured to select a target FD from FDs of multiple processes of the target process group; and
a distributing module configured to distribute by the target FD, the UDP message.

In a third aspect, an electronic device is provided according to an embodiment of the present application, and the electronic device includes a processor and a memory, where a computer program is stored on the memory and is operatable on the processor, the computer program, when being executed by the processor, causes the electronic device to implements the method according to the first aspect or various possible implementation of the first aspect.

In a fourth aspect, a computer readable storage medium is provided according to an embodiment of the present application. Computer instructions are stored in the computer readable storage medium, and when executed by a processor, causes the method according to the first aspect or various possible implementations of the first aspect to be implemented.

In a fifth aspect, a computer program product including a computer program is provided according to an embodiment of the present application. The computer program, when being executed by a processor, causes the method according to the first aspect or various possible implementations of the first aspect to be implemented.

According to the UDP message distribution method, the UDP message distribution apparatus, the electronic device and the computer readable storage medium provided by the embodiments of the present application. In response to there being multiple process groups for one application service concurrently, each of the multiple process groups has an EBPF resource independent from each other, and the EBPF resource is used to store information of an FD of each process in each of the multiple process groups. After a UDP message is received, a server is configured to determine a target process group from multiple process groups of a reuseport group according to a quadruple of the UDP message, select a target FD from the FD of each process of the target process group, and receive and transmit data by using the target FD. In this way, since each of the multiple process groups has an EBPF resource independent from each other, the processes belong to different process groups do not preempt the same FD, which ensures that the UDP message is not distributed in disorder in response to there being multiple process groups for one application service concurrently, thereby ensuring the service quality. Moreover, the problem of performance consumption due to soft interrupt caused by UDP connect can be solved, so that the concurrency capability is high.

BRIEF DESCRIPTION OF THE DRAWINGS

For more clearly describe the technical solutions in embodiments of the present application, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
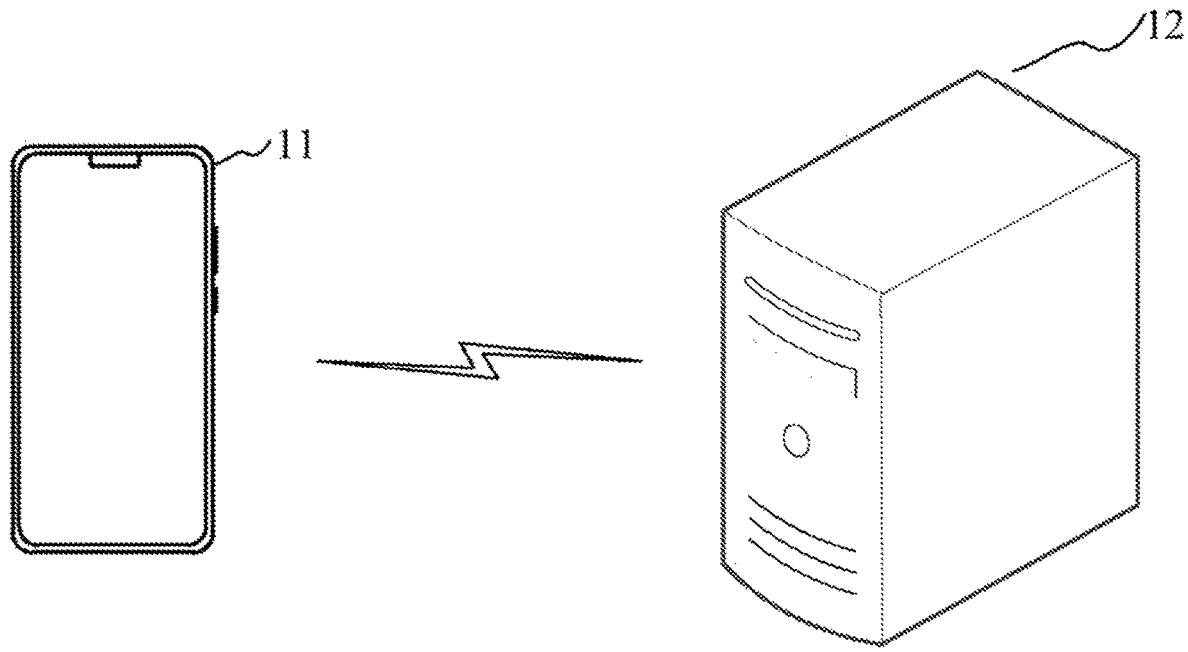
FIG. 1 is a schematic implementation environment diagram of a UDP message distribution method provided according to an embodiment of the present application.

To make the objectives, technical solutions and advantages of the present application clearer, the embodiments of the present application will be further described in detail below with reference to the accompanying drawings.

Currently, Transmission Control Protocol (TCP) is highly reliable but slow. UDP has low latency, vulnerable network resistance, and other characteristics, so that UDP is widely applied to audio and video transmission, such as a live streaming scene. UDP is different from TCP in that UDP has no connection concept, and in response to a Nginx server using UDP, data is received and transmitted with the same UDP port over multiple processes for one application service on the Nginx server. Generally, in response to hot update or upgrade of the application services being pending, one application service will have one process group, the process group includes multiple processes, and a UDP message can be received and transmitted over each of the multiple processes in the process group using a file handle (FD) of the corresponding process without issues. However, in response to the application services being subjected to hot update or upgrade, there are 2 or even more process groups simultaneously that will preempt the FD. As a result, each process group has disorder in receiving and transmitting the UDP message. For example, one UDP message should be transmitted to a process in a new process group, but transmitted to a process in an old process group; and for another example, one UDP message should be transmitted to a process in an old process group, but transmitted to a process in a new process group, which results in the unavailability of the entire application service and affects the service quality.

In the live streaming scene, it is assumed that up-streaming is underway at a streamer, up-streaming data should be transmitted to the process in the old process group, and in case of the disorder, up-streaming will be disconnected, which results in the interruption of live streaming. Similarly, during the down-streaming at a viewer, a terminal device transmits the UDP message to the Nginx server for requesting down-streaming, where the UDP message gets distributed to the process in the old process group instead of the new process group, which results in the failure for the viewer to watch the live streaming.

In response to the problem of the disorder in distribution of the UDP message being solved in the UDP connect manner, there may bring a new problem of performance consumption due to single-processor soft interrupt. Moreover, the concurrency of the UDP connect solution is low, which is approximately 500.

Based on this, a UDP message distribution method, a UDP message distribution apparatus and a computer readable storage medium are provided according to the embodiments of the present application. Each time a new process group is created, an EBPF resource is distributed to the new process group, so that each of the multiple process groups has the EBPF resource independent from each other, which ensures that a UDP message is not distributed in disorder in response to there being multiple process groups for one application service concurrently, thereby improving the service quality.

FIG. 1 is a schematic implementation environment diagram of a UDP message distribution method provided according to an embodiment of the present application. Referring to FIG. 1, a network architecture includes a terminal device 11 and a server 12.

The terminal device 11 may be a terminal device at the streamer, and may also be a terminal device at the viewer, including but not limited to a mobile phone, a tablet computer, a personal computer, an electronic book reader, a laptop portable computer, a desktop computer, etc. which are provided with an Android operating system, a Microsoft operating system, a Symbian operating system, a Linux operating system, or an Apple iOS operating system.

The server 12 may be hardware, and may also be software. The server 12, as the hardware, is a single server or a distributed server cluster consisting of multiple servers. The server 12, as the software, may be multiple software modules or a single software module, which will not be limited to the embodiments of the present application. The server 12 is a Nginx-based server, including but not limited to edge nodes over a content delivery network (CDN), and the like.

The server 12 is configured to provide multiple application services that may run simultaneously, one application service corresponds to one UDP port, one UDP port may be available for multiple process groups simultaneously, the UDP message is distributed with the same UDP port over the multiple process groups, and the UDP port is a reuseport group. Reuseport is a characteristic of a socket that allows the UDP message to be distributed with the same UDP port for different FDs.

The present application aims to solve the following problem, in response to there being multiple process groups for one application service concurrently, the UDP message is distributed with the same UDP port over the multiple process groups, how to ensure that the UDP message is not distributed in disorder. The reason why the multiple process groups for one application service exist concurrently is the hot update or upgrade of the application services. Additionally, in response to a certain process being abnormal in one process group, based on the solution, it can also be ensured that the distribution of the UDP message is free of disorder. In response to there being multiple process groups for one application service concurrently, the abnormal process is a process in the process group that is newly created among the multiple process groups; and in response to one application service having only one process group, the abnormal process is a process in the process group.

The server 12 manages a UDP data stream by EBPF, the EBPF characteristic is supported on a new Linux kernel, and different logic problems of different services can be solved by writing a piece of service logic code in an application layer and implanting the service logic code into the kernel for operation, without modifying a kernel code. The method really achieves a pluggable operation. Compared with the method for modifying the kernel code, the above method has the characteristics of quick cycle and high safety.

The server 12 is configured to initialize EBPF resources and load the EBPF resources into the kernel during module initialization. Meanwhile, considering a multi-port scene, namely multiple UDP ports, each UDP port may be a reuseport group, and the UDP ports have independent EBPF resources which do not interfere with each other. For example, each UDP port includes a port 80 and a port 443, with the port 80 having its own EBPF resource, and the port 443 having its own EBPF resource. Each port 80 may have multiple process groups, whereas the port 443 may also have multiple process groups.

It should be understood that the number of terminal devices 11 and the servers 12 in FIG. 1 is merely illustrative. In practical implementation, any number of terminal devices 11 and servers 12 are deployed according to practical requirements.

Figure 2:
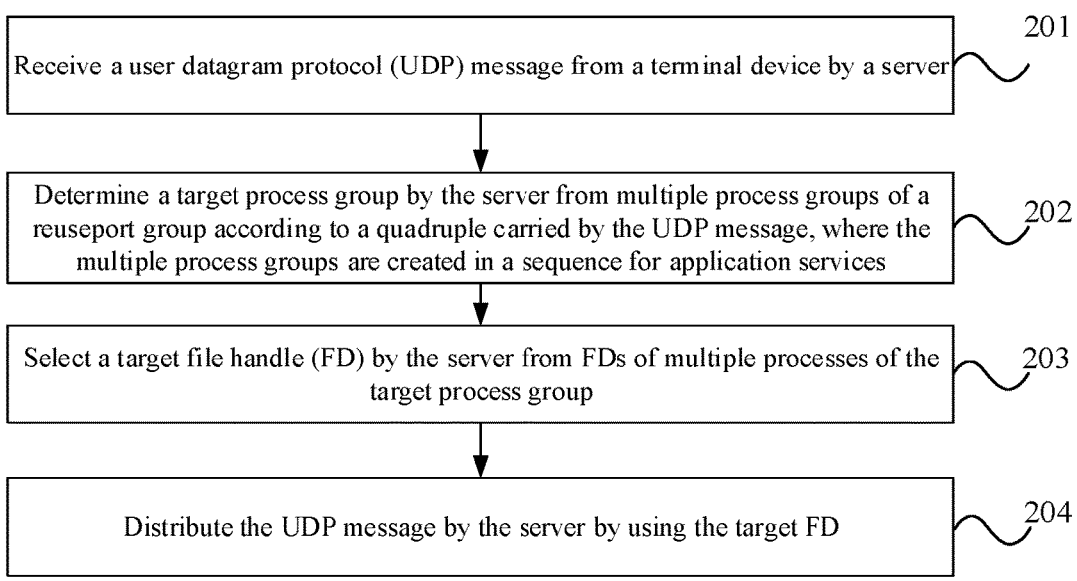
FIG. 2 is a flow chart of a UDP message distribution method provided according to an embodiment of the present application.

Based on the architecture shown in FIG. 1, a UDP message distribution method according to an embodiment of the present application is described in detail. Reference is made to FIG. 2 for an exemplary embodiment.

FIG. 2 is a flow chart of a UDP message distribution method according to the embodiment of the present application. The present embodiment is described from the perspective of a server as follows.

In operation 201, a UDP message is received by a server from a terminal device.

The terminal device is embodied as a streamer or a player terminal of a viewer, which is not limited in the embodiments of the present application. In response to the terminal device being the streamer, the UDP message carries up-streaming data, and after the UDP message is received, the server is configured to find a target FD, and transfer the up-streaming data carried by the UDP message to the worker process on the upper layer by using the target FD. In response to the terminal device being the player terminal, the UDP message is used to request live streaming data, and after the UDP message is received, the server is configured to determine a target FD according to the UDP message, and return the live streaming data to the terminal device by using the target FD.

In operation 202, a target process group is determined by the server from multiple process groups of the reuseport group according to a quadruple carried by the UDP message, and the multiple process groups are created in a sequence for application services.

According to the embodiments of the present application, the server is configured to provide multiple application services that can run concurrently. The application services inevitably require hot update or upgrade. The hot update, also known as reload, configuration update, hot reload, reload configuration and the like, which refers to the dynamic loading configuration and update of parameters in the application services, but does not change the entire application services, and does not perform version upgrade on the application services. Upgrade refers to version upgrade of the application services. Specifically, the application services before being upgraded are replaced with the application services after being upgraded.

After the server is started, a master process is created for one application service, and a group of worker processes are created by the master process. The Master process is responsible for managing the running status of the worker process. This group of worker processes is one of the multiple process groups in step 202. In response to hot update being performed on the application service, a new process group is generated every reload. In order to ensure that the data on the old process is not interrupted, the old process does not exit immediately, but exits only when the exit time arrives, which causes the multiple process groups to exist concurrently after repeated reload. Generally, continuously repeated reload does not occur. However, in response to there being an emergency modification of configuration by operation and maintenance personnel, repeated reload occurs, so that the multiple process groups exist concurrently. In response to reloading each time, the master process does not change and creates a group of worker processes.

In order to avoid that the multiple process groups occupy a large number of resources at the same time, a first number is preset, the first number is used to indicate the maximum number of process groups of the reuseport group and may be 5, 32 and the like, which is not limited to the embodiments of the present application.

It should be noted that the first number is used to indicate the maximum number of process groups in one reuseport group, and does not represent the maximum number of reloads. For example, the first number is 5, indicating that as many as five process groups exist in one reuseport group. In response to five process groups existing concurrently, there may be 4, 5, or more reload times, which is because once the number of process groups that exist concurrently reaches the first number, the server will clean up the process group created at the earliest and the related record before reload.

Similarly, a new process group is also generated during each upgrade. Unlike reload, in response to upgrading each time, the server creates a new master process, and the new master process creates a group of worker processes, thus obtaining a new process group.

According to the embodiments of the present application, the server is configured to maintain a dynamic array and represents the dynamic array with reuseport array. Elements in the dynamic array are an EBPF resource of each process group, the number of elements is the same as the number of the process groups existing concurrently, and one element corresponds to one process group. It can be seen that each process group has an EBPF resource independent from each other, and the EBPF resource is used to maintain the FD of each process in the process group. For example, in response to there being two process groups at the same time, each process group includes seven processes, and for any process group, seven FDs are stored in the independent resource of the process group, and different FDs correspond to different processes.

Optionally, in some embodiments, the independent resource is used to store information of a file handle FD of each process in a corresponding process group, and the number of process groups in the multiple process groups is greater than or equal to 2.

Illustratively, after repeated reload or upgrade, multiple process groups exist concurrently, and FDs of each process in one process group and some other resources are stored in the independent resource of one process group.

In embodiments of the present application, the server is configured to distinguish the client (a terminal device transmitting the UDP message) according to the quadruple. It is assumed that the UDP message of one terminal device (terminal device 1) is distributed to the process in the old process group before reload. After that, the UDP message of the terminal device is certainly distributed to the old process group after reload. After the new terminal device (terminal device 2) transmits the UDP message, the UDP message of the terminal device 2 is distributed to the new process group since the IP of the terminal device 2 is different from the IP the terminal device 1.

After the UDP message is received, the server is configured to extract four elements from a header of the UDP message. Specifically, the four elements include a source port number, a source IP address, a destination port number, and a destination IP address. The server is further configured to determine a target process group from the multiple process groups according to the quadruple. Since each process group has an independent resource, specifically, FDs of different process groups are different, so that different process groups do not preempt the same FD, and the disorder of the UDP message is not caused. Specifically, the UDP message originally distributed to the new process group will not be distributed to the old process group, and the UDP message originally distributed to the old process group will not be distributed to the process in the new process group.

For example, there are two process groups at the same time, which are process groups created before and after the application service reload, and the process group created before the reload is referred to as an old process group. Conversely, the process group created after the reload is referred to as a new process group. There are seven processes in the old process group, and each process has its own FD. There are seven FDs in the new process, and each process also has its own FD. The FD of the new process is newly generated, but not inherited from the old process. If the prior art is used, since the new process group is generated by copying the old process group, the processes in the new process group inherit the FDs of the processes in the old process group, so that the new process group and the old process group have 14 processes, which have only seven FDs, resulting in data disorder due to hash mapping changes. According to the embodiments of the present application, the new process group and the old process group have 14 processes, which have 14 FDs, and processes in different process groups do not preempt the same FD, so that data disorder will not occur.

In operation 203, a target FD is selected by the server from the FD of each of the multiple process of the target process group.

Figure 3A:
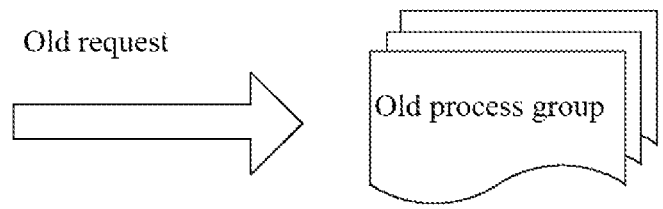
FIG. 3A is a schematic diagram illustrating a relationship between a UDP message and a process group in a UDP message distribution method provided according to an embodiment of the present application.
Figure 3B:
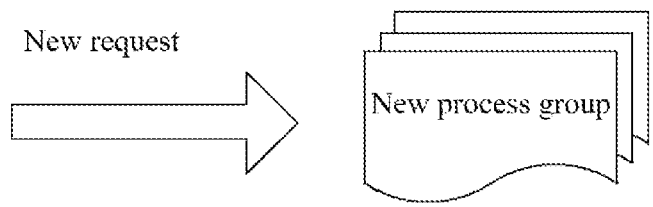
FIG. 3B is another schematic diagram illustrating a relationship between a UDP message and a process group in a UDP message distribution method provided according to an embodiment of the present application.

FIG. 3A is a schematic diagram illustrating a relationship between a UDP message and a process group in a UDP message distribution method according to embodiments of the present application. FIG. 3B is another schematic diagram illustrating a relationship between a UDP message and a process group in a UDP message distribution method according to embodiments of the present application.

Referring to FIG. 3A, in response to a quadruple of one UDP message being the same as a quadruple of the previously received UDP message, the UDP message is regarded as an old request, the target process group is an old process group, the old request is distributed to the old process group, and the server determines a target FD from the FD of each process of the old process group.

Referring to FIG. 3B, in response to a quadruple of one UDP message being different from a quadruple of the previously received UDP message, the UDP message is regarded as a new request, the target process group is a new process group, the new request is distributed to the new process group, and the server determines a target FD from the FD of each process of the new process group.

The server selects a target FD from the FDs of the processes included in the target process group based on the load balancing principle, and the like. For example, the server determines a process with a smaller load from multiple processes included in the target process group, and uses the FD of the process as the target FD.

In operation 204, the UDP message is distributed by the server by using the target FD.

In response to the UDP message being a message from the streamer, the server transmits the up-streaming data to the upper worker process by using the target FD. In response to the UDP message being a request message from the viewer, the server obtains video data and the like and responds to the viewer by using the target FD.

According to the UDP message distribution method provided by the embodiments of the present application. In response to there being multiple process groups for one application service concurrently, each of the multiple process groups has an EBPF resource independent from each other, and the EBPF resource is used to store information of an FD of each process in each of the multiple process groups. After a UDP message is received, a server is configured to determine a target process group from multiple process groups of a reuseport group according to a quadruple of the UDP message, select a target FD from the FD of each process of the target process group, and receive and transmit data by using the target FD. In this way, since each of the multiple process groups has an EBPF resource independent from each other, the processes belong to different process groups do not preempt the same FD, which ensures that the UDP message is not distributed in disorder in response to there being multiple process groups for one application service concurrently, thereby ensuring the service quality. Moreover, the problem of performance consumption due to soft interrupt caused by UDP connect can be solved, so that the concurrency capability is high.

Optionally, in some embodiments, in response to the process groups being created each time, the server creates a second process group by using a master process, a first process group and a second process group are two process groups created successively in the multiple process groups, and the first process group corresponds to a first group of FDs. Then, a second group of FDs is generated for the second process group. Finally, the second group of FDs is set to standby resources in a resource set to obtain the EBPF resource of the second process group, the resource set stores the pre-created standby resources, the first number of the standby resources in the resource set is the same as the maximum number of the process groups of the reuseport group, and the second number of process groups in the multiple process groups is less than or equal to the first number.

Illustratively, in some embodiments, a resource set is pre-created on a server, the resource set stores pre-created standby resources, the number of the standby resources is a first number, and the first number is the maximum number of process groups of the reuseport group. For example, in response to at most five process groups existing concurrently in a reuseport group which is preset, the first number is equal to 5. The number of process groups present at the same time may be 2, 3, 4, or 5. Certainly, if no load or upgrade occurs, only one process group exists in one reuseport group.

Each time the server creates a new process group, the server stores the sequence number of the current latest process group. For example, in response to only one process group existing, the sequence number of the process group is 1. After a new process group is created by the first reload, the sequence number of the new process group is 2, and so forth. The process group is created by an application layer of the server, and the application layer is responsible for cleaning EBPF resources. Generally, the number of processes in a new process group is the same as the number of processes in an old process group. However, these are not limited in the embodiments of the present application, and the number of processes in the old process group may be equal to, less than or more than the number of processes in the new process group.

Whether reload or upgrade, in response to the server creating a new process group each time, an existing process group is a first process group before the process group is created this time, and the process group created this time is a second process group. In response to the second process group being created each time, the server creates a second process group by using the master process, the first process group and the second process group are two process groups created successively in the multiple process groups, and the first process group corresponds to the first group of FDs. However, the processes in the second process group do not inherit the FDs of the processes in the first process group, but generate a new FD for each process in the second process group, specifically, the second group of FDs. After the second group of FDs is generated, the server takes one standby resource from the resource set, and sets the second group of FDs to the standby resource, so as to obtain the EBPF resource of the second process group. Then, the EBPF resource of the second group is stored as an element in a dynamic array (e.g., the reuseport array).

According to this solution, in response to a process group being created each time, the server is configured to generate a group of FDs for the newly created process group, not to inherit the FD of the process in the old process group, and prevent the multiple processes from preempting the same FD after the server receives the UDP message, which ensures that the UDP message is not transmitted in disorder.

Next, how to generate a group of new FDs for the new process group after a new process group is created each time is described in detail from the perspective of the reload and the upgrade.

First, a reload scene.

In response to a hot update being performed on an application service to create a second process group, the server filters out the FD in a listening structure of a first process group before the server generates a second group of FDs for the second process group, and the first process group and the second process group are both created by a first master process.

In the reload scene, the master process is not changed, so that the second process group may obtain the listening structure of the first process group. According to the traditional solution, in response to an Nginx-based server performing a hot update on the application service, the FD of the process in the first process group is closed, and the FD of each process in the first process group is inherited by the corresponding process in the second process group, resulting in that the FD of the first process group is the same as the FD of the second process group, and the two groups of FDs cannot be set in the dynamic array (e.g., the reuseport array). According to the present application, in order to ensure that the first group of FDs of the first process group is different from the second group of FDs of the second process group, in response to the EBPF mark in the listening structure in the first process group being currently a listening structure of an EBPF mode, the FD of the listening structure is not inherited, but is filtered out and is not transferred to the second process group, and the FD of the process in the first process group is not closed.

According to this solution, the FD in the listening structure of the first process group is filtered out for the reload scene, so that the process in the second process group does not inherit the FD of the first process group, but generates a group of new FDs for the second process group, specifically, the second group of FDs, so as to ensure that the first group of FDs and the second group of FDs of the first process group are different, thereby preventing multiple processes from preempting the same FD during hot update, and ensuring that the distribution of the UDP message in the hot update scene is not disordered.

Second, an upgrade scene.

In response to an application service being upgraded to create a second process group, a first master process is used to transfer an environment variable to a second master process, the first main process is the master process before the application service is upgraded, and the second master process is the master process after the application service is upgraded. In addition, in response to there being an FD carrying a preset identifier in the environment variable, the server closes the FD carrying the preset identifier. The preset identifier is used to indicate that the FD is the FD of the EBPF.

In the upgrade scene, the master process changes. Specifically, before upgrade, the master process is the first master process, then the master process becomes the newly created second master process after upgrade. The whole process space is changed and replaced with a new executable program, so that the second process group cannot obtain the listening structure of the first process group. The newly created second process group is generated by a fork function and an execv function. The FD of each process in the first process group is not closed. According to a traditional solution, for an upgrade scene, a Nginx-based server transfers all FDs of an old listening structure of a first process group to a new master process through an environmental variable, specifically, a second master process. After the second master process obtains the FD through the environmental variable, the FD is set to the listening structure of the second process group for further use.

Different from the traditional solution, this solution distinguishes a common FD from FD of an EBPF in response to the FD being transferred by using an environment variable, a preset identifier is added to the FD of the EBPF, and the preset identifier is, for example, b and the like, which is not limited in the embodiments of the present application. For example, FD transferred with an environmental variable includes 12, 13, b14 and 15, where b14 indicates that the FD is the FD of EBPF, with a value of 14. After the second master process parses FD carrying the preset identifier, the FD is closed, so that the second process group no longer inherits the FD, the server generates a group of new FDs of the EBPF for the second process group, and the group of FDs is set to one standby resource to obtain the EBPF resource of the second process group.

According to this solution, for an upgrade scene, since the master process changes, and the FD is transferred and distinguished by means of the environment variable, the FD carrying the preset identifier is closed, so that the second process group does not inherit the FD, but generates a group of new FDs for the second process group, specifically, the second group of FDs, so as to ensure that the first group of FDs and the second group of FDs of the first process group are different, thereby preventing the multiple processes from preempting the same FD during upgrade, and ensuring that the distribution of the UDP message in the upgrade scene is not disordered.

During upgrade, there may be a scene where an upgrade fails. In this case, the server creates a third process group by using the first master process, and closes FD in the listening structure of the third process group. Then, the server generates a third group of FDs for the third process group, and creates the EBPF resource corresponding to the third process group according to the third group of FDs.

Illustratively, when the upgrade fails, the old master process, specifically, the first master process starts a group of worker processes again, and the group of worker processes is the third process group. For example, one application service has a first process group, and if the upgrade succeeds, the new master process, specifically, the second master process creates a second process group. However, when the upgrade fails, the first master process creates a third process group. If the existing solution is adopted, since the first master process does not modify the listening structure of the first process group, the FD of the third process group is the same as the FD of the first process group, and the problem occurs. Moreover, the first process group exits when the exit time arrives. According to the embodiments of the present application, a group of FDs, specifically, a third group of FDs, is re-generated for the third process group, and the third group of FDs is set to one standby resource to obtain the EBPF resource of the third process group. Specifically, in response to the first master process creating the third process group, a group of new FDs, specifically, the third group of FDs, is obtained according to the third process group, and the third group of FDs is added into the dynamic array (e.g., the reuseport array) through an EBPF interface. Subsequently, the new UDP message is distributed to the FD in the third process group, and then the third process group is started, and a new FD is used for services over a worker process in the third process group.

According to this solution, the old master process restarts a process group when the upgrade fails, and FD is generated for the new process group, so that the new process group has the independent EBPF resource, the distribution of the UDP message is not disordered when upgrade fails, and the purpose of improving the service quality is achieved.

According to the embodiments, how to ensure that the distribution of the UDP message is not disordered in response to at least two process groups existing concurrently during reload and upgrade is emphatically described. According to another scene, there is an abnormal process in the newly created process group in the multiple process groups, which may also cause disorder in receiving and transmitting the UDP message. The following describes in detail how to solve data disorder caused by an abnormal process.

After the server determines that there is an abnormal process in the newly created process group in the multiple process groups, a new worker process is created for the newly created process group, and the FD of the worker process is the FD of the abnormal process.

Illustratively, a certain process in the newly created process group may be abnormal due to bug regardless of reload or upgrade, and the process is an abnormal process or a suspended process. For example, the newly created process group includes seven processes, and in response to one of the seven processes being abnormal, six normal processes are left, and if the prior art is adopted, the hash table maintained by the server will be disordered, thereby causing the distribution of the UDP message to be disordered. According to this solution, in response to an abnormal process occurring in the newly created process group, the master process (in the reload scene, the master process is the first master process, and in the upgrade scene, the master process is the second master process) restarts a worker process, and the worker process continues to use the FD of the abnormal process. In this way, the master process associates the FD according to the sequence number of each process in the newly created process group, so that the newly created worker process can receive the UDP message.

In response to an abnormal process occurring in the old process group, the old process group exits when the exit time arrives since a new process group has been created. Therefore, the server does not need to perform processing. The old process group is other process groups except the newly created process group in the multiple process groups. For example, there are five process groups at the same time, the fifth process group is a newly created process group, and the other four process groups are old process groups.

In addition, if the reload or the upgrade is not performed, only one process group exists, and an abnormal process also occurs, which requires the same processing mode, specifically, the master process creates a new worker process, and the worker process continues to use the FD of the abnormal process.

According to this solution, in response to an abnormal process occurring in the process group, the master process recreates a worker process and continues to use the FD of the abnormal process, so that the distribution of the UDP message is not disordered in response to the abnormal process occurring, and the purpose of improving the service quality is achieved.

Optionally, in some embodiments, the server maintains a dynamic array (e.g., the reuseport array). After the process group is created each time, the server stores the EBPF resource of the process group created this time in the dynamic array as an element. in response to the number of elements in the dynamic array being greater than or equal to the first number, the server cleans the elements of the first created process group according to the creation sequence of the process groups in the multiple process groups, and stores the EBPF resource of the process group created this time in the dynamic array.

Illustratively, for a reload scene, a new process group will be generated every reload, and since the master process is not changed, an exit_master interface will not be invoked for resource cleanup. The exit_master interface is an interface registered by the server for completing resource recovery.

The server predefines a first number, specifically, the number of process groups that are most present at the same time. After the process group is created each time, the server stores the EBPF resource of the process group in the dynamic array as an element. In response to the number of elements in the dynamic array reaching the first number for the first time, it indicates that standby resources in a pre-created resource set have been used up. In response to the process group being subsequently created again, the EBPF resource corresponding to the first created process group needs to be cleaned up from the dynamic array to release the EBPF resource, so that after a new process group is created, the new process group has the EBPF resource.

According to this solution, for a reload scene, the EBPF resource is recycled, so that application services can be subject to repeated reload, and the purpose of improving the service quality is achieved by performing hot update on the application services in time.

For an upgrade scene, after a new process group is created each time, the master process changes, and the new master process invokes the exit_master interface for resource cleanup. By cleaning up the resource in time, the application services can be subject to repeated upgrade; and by upgrading the application services in time, the purpose of improving the service quality is improved.

According to the embodiment, how to ensure that the distribution of the UDP message is not disordered in response to at least two process groups existing concurrently for one reuseport group on the server is described. However, one server has multiple UDP ports, and each UDP port may be used as a reuseport group. For each reuseport group, the server performs the distribution of the UDP message by the UDP message distribution method according to the embodiments of the present application, so that the problem of data disorder is avoided.

In addition, the streaming media protocol implemented based on the UDP includes the SRT, the QUIC and the like. Multiple UDP ports are configured for one protocol, and different protocols have different UDP ports. Each UDP port corresponds to one EBPF resource, and if there are multiple UDP ports, multiple EBPF resources need to be loaded into the kernel. Meanwhile, the EBPF resource of each port is stored in different paths.

Moreover, the different ports are distinguished by a reuseport group, and the reuseport group is an IP+ port, so that in response to at least two IP protocols being bound on the same port, the reuseport group serves at least two IP protocols at the same time.

For example, the UDP port is a 10080 port, IPv4 and IPv6 are bound on the UDP port simultaneously. The UDP port is considered as two reuse ports, one serving the IPv4, and the other one serving the Ipv6.

According to this solution, multiple reuseport groups can be created based on one UDP port by supporting multiple ports, and the flexibility is high.

The UDP message distribution method according to the embodiment of the present application is universal, can be simultaneously applicable to SRT, QUIC, WEBRTC and other streaming media protocols, and can solve the problem of data disorder caused by using the same UDP port to distribute a UDP message for multiple process groups. The UDP message distribution method according to the embodiment of the present application is described in detail with SRT as an example. For example, referring to FIG. 4, which is a schematic structural view of a newly added module in a server in the UDP message distribution method according to an embodiment of the present application.

Figure 4:
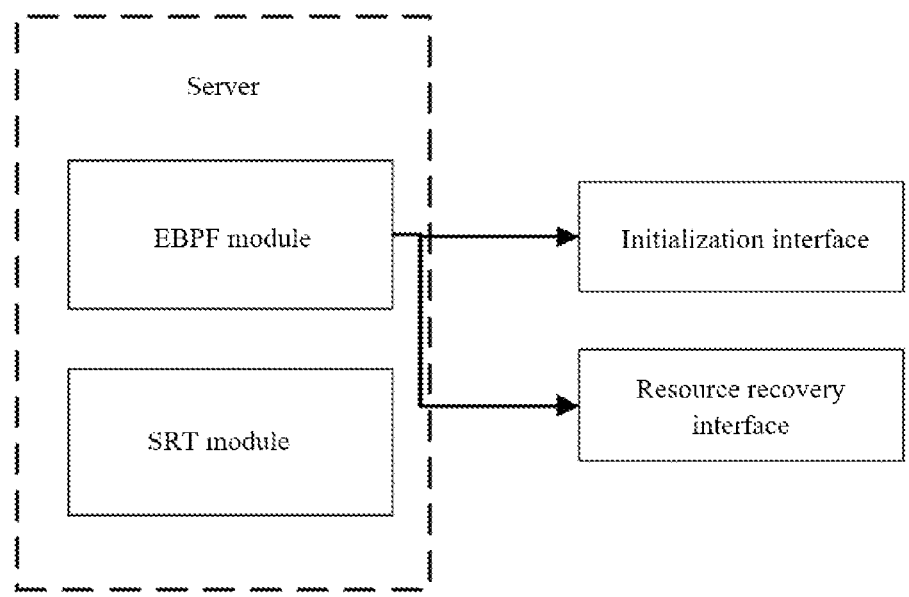
FIG. 4 is a schematic structural view of a new module in a server in a UDP message distribution method provided according to an embodiment of the present application.

Referring to FIG. 4, in response to the server being used for SRT, compared with a traditional server, the server adds an EBPF module (e.g., ngx_core_bpf_moudle) in addition to an SRT module (e.g., ngx_srt_moudle) to complete EBPF related processing. The EBPF module registers two interfaces, one is an initialization interface (ngx_core_bpf_int_moudle), and the other is a resource recovery interface (e.g., ngx_core_bpf_exit_moudle_). The initialization interface is configured to complete initialization and loading of EBPF resources, and the resource recovery interface is configured to complete resource recovery. In this way, the problem of disordered distribution of UDP messages caused by using the same reuseport group for multiple process groups is solved, and in the master-worker mode, all EBPF operations must be completed by the master process.

According to this scheme, one reuseport group has a listening structure, and the listening structure has a socket address (sockaddr). In response to the sockaddr of the two listening structures being the same, the two listening structures correspond to one reuseport group, and in response to the sockaddr of the two listening structures being different, the two listening structures correspond to different reuseport groups. One UDP port may have one, two or more reuseport groups. The server adds a preset identifier in the listening structure of one reuseport group, which indicates that the reuseport group distributes the UDP message by using the scheme of the embodiments of the present application.

According to the embodiments of the present application, in order to enable the server to implement the UDP message distribution method, the following five points are mainly modified.

1. Module Initialization.

The server is configured to perform an initialization operation in the initialization interface, and the EBPF has a requirement for the kernel version of the server. In response to the kernel version of the server being too low, the UDP message distribution method according to this scheme is not supported. Therefore, the server needs to determine the kernel version first. For example, a uname system call mode is used to determine whether the kernel is supported, and if the kernel is not supported, a traditional UDP connect mode is used. In response to the kernel version being supported, the UDP message distribution method according to the embodiment of the present application is used.

In response to the kernel version being supported, the server is configured to select a target process group from multiple process groups through a quadruple. One application service has multiple process groups concurrently, and FD of each process of one process group is a group of FDs, and is regarded as EBPF resources. In response to the quadruple of one UDP message being a new quadruple, the UDP message is a new request, and the new request obtains a target FD from a new process group. In response to the quadruple of one UDP message being an old quadruple, the UDP message is an old request, and a target FD is obtained from an old process group. After a new process group is created each time, the server needs to store the sequence number of the current latest process group. For example, there is a process group currently, then the sequence number is 1, and in response to a new process group being generated by performing the reload once, the sequence number of the new process group is 2, and so forth.

The new process group is created by an application layer, and the application layer is responsible for cleanup. An EBPF program operates in the kernel, an EBPF-related resource is set in a module initialization function, such as a dynamic array (reuseport array), and then the ebpf program is loaded into the kernel.

In a reload scene, if the master process is not changed or the current master process exists, the ebpf program does not need to be loaded again during reload. Therefore, FDs of the EBPF needs to be stored, and only the previous FDs need to be loaded during repeated reload. A storage method is file system association, and bpf_obj_pin and bpf_pin_get are adopted. For example, a handle of an EBPF program is mapped to a path of a file system, specifically, /sys/fs/bpf/udp_reuseport/udp_reuseport_prog, and storage paths of different reuseport groups are different.

2. Core Code Modification.

According to this scheme, the server is a Nginx-based server, Nginx is an open-source component, and some modifications to the open-source component need to be performed.

Since the UDP has no concept of connection, in response to there being multiple processes, each process has an FD, and one process and one FD serve multiple clients. In response to reload or upgrade being performed, one application service has multiple process groups concurrently, the FD of the old process group continues to serve an old request, and a new request is served by the FD in the new process group. In response to a traditional Nginx-based server performing reload or upgrade on an application service, FD of each old process in the old process group is closed. According to this scheme, by modifying a Nginx component, FD of each process in the old process group is not closed in response to reload or upgrade being performed on the application service. For example, if a preset identifier is 1, it indicates that the kernel version of the server supports the EBPF, and at this moment, after the new process group is created each time, FD of each process in the old process group is not closed.

In response to a traditional Nginx-based server performing reload or upgrade on an application service, FD of the listening structure of the old process group is transmitted to the listening structure of the new process group in an inherited manner, resulting in that the FD of the two process groups is the same and cannot be set into a dynamic array (e.g., reuseport array). Therefore, according to the embodiments of the present application, in response to the kernel version supporting the EBPF, and the server uses the UDP message distribution method of the present application, the FD in the listening structure of the old process group is not inherited after the new process group is created each time, but the FD in the listening structure of the old process group is filtered out. According to the specific practice, the FD carrying the preset identifier in the old cycle is not transmitted to the new cycle. The listening structure is configured to store listening information and is created by a master process, each worker process has a listening structure, and the listening information stored in the listening structure is, for example, FD. According to this scheme, a new process group is generated each time, and the process in the new process group does not inherit the FD of the process in the old process group.

In response to upgrade being performed, it is different from reload. Since the master process is not changed during reload, a listening structure of the old process can be obtained. However, in response to the upgrade being performed, the master process changes, a new master process is generated in a fork+execv mode, and the new main process will inherit all the listened FDs of the old main process. In response to the new master process creating a new process group, the inherited FD is turned off, and a new FD is generated for the new process group. According to the traditional scheme, the server transmits all FDs of the listening structure of the old process group to the new master process through environment variables, and the new master process obtains the FDs through the environment variables and then uses them for a new process group. Therefore, different processes in the two process groups use the same FD. According to this scheme, transmission and setting of the FD are modified. In the transmission process, in order to distinguish a common FD from an FD of EBPF, a preset identifier is added to the FD of the EBPF, and the preset identifier is, for example, b and the like, which is not limited to the embodiment of the present application. For example, the transmitted FD includes 12, 13, b14, and 15, where b14 represents the FD of the EBPF, and the value is 14. After a new master process parses an FD of the EBPF, the FD is closed, a new process group does not inherit the FD, the new master process generates a group of new FDs for the new process group, and then the new FDs of the group are added into the dynamic array (e.g., reuseport array).

When the upgrade fails, the old master process starts a group of worker processes again, specifically, a third process group. In this scene, since the old master process does not modify the FD of the first process group, the FD of the third process group is the same as the FD of the first process group, and the FD of the third process group cannot be set into the dynamic array. Therefore, according to this scheme, the FD in the listening structure of the third process group is closed, a group of FDs is regenerated for the third process group, specifically, a third group of FDs, the third group of FDs is set into the dynamic array, a subsequent new request obtains a target FD in the third group of FDs, then a worker process in the third process group is started, and the newly started worker processes can use new FD services.

According to this scheme, since one reuseport group has multiple process groups, and each process in each process group has its own FD to process UDP messages, the UDP message reaches the corresponding process by using the EBPF mode from the kernel at the bottom layer. The UDP message of each client is distinguished inside the process by a quadruple. The process determines whether one UDP message is transmitted to a new process or an old process, and after the UDP message reaches the process, the application layer distinguishes different connections according to the information of the maintained client.

3. Solution to Abnormal Scene

According to the embodiments of the present application, the abnormal scene includes reload, upgrade, and process abnormality.

For a reload scene, the version of application services does not change, but parameters may be updated. The master process will not exit and reload the configuration. In response to a new process group being created each time, the master process creates a second process group according to the first process group, and generates a group of new FDs for the second process group, so that the FD of the first process group is different from the FD of the second process group, and each process group receives the UDP message through its own FD, thereby ensuring that the distribution of the UDP message is not disordered.

For an upgrade scene, application services are upgraded, and an application program of a new version replaces an application program of an old version. The new master process loads an executable program of the new version, and then the new master process creates a new group of FDs and new process groups. Since the traditional Nginx sets the inheritance of FDs, FDs of the old process group are inherited to the new process group, which is not problematic for TCP. However, for the UDP, since the EBPF is used, it is necessary to respectively set a group of FDs for each process group to ensure that these process groups provide services at the same time, otherwise, if the FDs of the two or more process groups are the same, the distribution of the UDP message is disordered. Therefore, according to the embodiments of the present application, the new process group does not inherit the FD of the old process group, but creates a new group of FDs, and loads the newly created FDs to the kernel, and each subsequent process group distributes the UDP message through its own FD.

For a process abnormality scene (e.g., coredump), the FD of each worker process is distributed in the master process, and then is loaded and associated with the EBPF through a kernel interface. At this time, the kernel maintains a group of FDs, and the FDs listen to the same port through reuseport, so as to ensure that the data is not disordered. In response to a worker process being suspended, the master process restarts a new worker process, and the FD is still a suspended process, namely, the FD of the abnormal process. The master process is associated with the previous FD according to the sequence number of each worker process, so that the restarted process may still receive the UDP message.

4. Multi-Port Problem.

According to the embodiments of the present application, one streaming media protocol may be configured with multiple ports, different protocols are configured with different ports, and the protocols include SRT, QUIC and the like. In this way, there may be multiple reuseport groups on the server, different reuseport groups correspond to different EBPF resources, and different reuseports correspond to different UDP ports or the same UDP port. For example, a port 123 is a port supporting SRT, and the port 123 is a reuseport group; and a port 111 is a port supporting QUIC, and the port 111 is a reuseport group. For another example, a port 10080 is bound with both IPv4 and IPv6 at the same time, the port 10080 corresponds to two reuseport groups, and the port 10080 serves both IPv4 and IPv6 at the same time. In response to multiple reuseport groups existing, each reuseport group in the multiple reuseport groups has its own EBPF resource, each reuseport group has multiple process groups, and each process group has an independent EBPF resource.

In response to there being multiple reuseport groups, the EBPF resources of each reuseport group need to be loaded into the kernel. At the same time, EBPF resources and a file system can be distinguished by way of naming during association:

/sys/fs/bpf/udp_reuseport_10080/udp_reuseport_prog represents the port 10080;
/sys/fs/bpf/udp_reuseport_10081/udp_reuseport_prog represents the port 10081.

According to the present application, different UDP ports are distinguished by the reuseport group, and the reuseport groups are distinguished by the IP+Port region. In response to one UDP port being bound to two or more IP protocols, one UDP port may create two or more reuseport groups. For example, in response to the port 10080 being bound to the IPv4 and the IPv6, two reuseport groups are created, and each group has an EBPF process.

The server is configured to traverse the listening structure to determine sockaddr in each listening structure. In response to the sockaddr being the same, it is considered that the ports corresponding to the two listening structures are the same reuseport group, and are loaded into the EBPF. Each reuseport group has multiple process groups, each process group has multiple processes, and each process has its own FD.

5. Resource Recovery Problem.

Referring to FIG. 4, the EBPF module is configured to register two interfaces, specifically, an initialization interface and a resource recovery interface, and the resource recovery interface loads a cleaning operation of the EBPF resource. In the Upgrade scene, the main process changes, and after a new process group is created each time, the EBPF module invokes the resource recovery interface to perform resource recovery.

In the reload scene, a group of EBPF resources are generated in each reload and are used to store the information of the FD of each process in the new process group, and the group of FDs is subsequently set into the resources to be used to generate EBPF resources of a new process group. However, since the master process is not changed, the resource recovery interface will not be invoked for cleanup, causing the resources to be leaked once every reload. According to the traditional scheme, the group of resources is cleaned only after all worker processes exit, and in response to the worker process not exiting before cleanup, the worker process cannot provide services. However, according to the existing scheme, there is no mechanism to obtain the opportunity for all worker processes to exit in a process group. Since the server supports repeated reload, the old process group before each reload may not end, and the exit opportunity of each worker process is different, so that it is impossible to know which worker processes belong to one group.

According to this scheme, the number of elements in the dynamic array cannot exceed the first number, and the first number may be, for example, 5, which is not limited to the embodiments of the present application. Once the number of the elements exceeds the first number, cleanup is required, so as to ensure that the number of elements existing concurrently is less than or equal to the first number, specifically, the number of process groups existing concurrently is less than or equal to the first number. For example, the first number is 5, indicating that there may be five process groups concurrently, with the sequence numbers of 0, 1, 2, 3, and 4, respectively. A group of FDs is created for a new process group each time to obtain an EBPF resource, and the EBPF resource is stored in one location of the dynamic array as an element. Before storage, whether the location is empty is determined, and if the location is not empty, an element originally maintained in the location is first cleaned up, and then the element created this time is stored in the location. There are five locations in the dynamic array, specifically, location 0 to location 4, respectively. In response to the elements being stored in the location 0 to location 4, the elements created by the reload are placed at the location 0, and since the location 0 is not empty, the EBPF resource corresponding to the location 0 may be cleaned up, such as releasing memory and other operations, and closing the FD of the EBPF resource. The newly created element is then stored in the location 0.

The following is an apparatus embodiment of the present application, and can be used for performing the method embodiment of the present application. For details not disclosed in the apparatus embodiment of the present application, please refer to the method embodiment of the present application.

Figure 5:
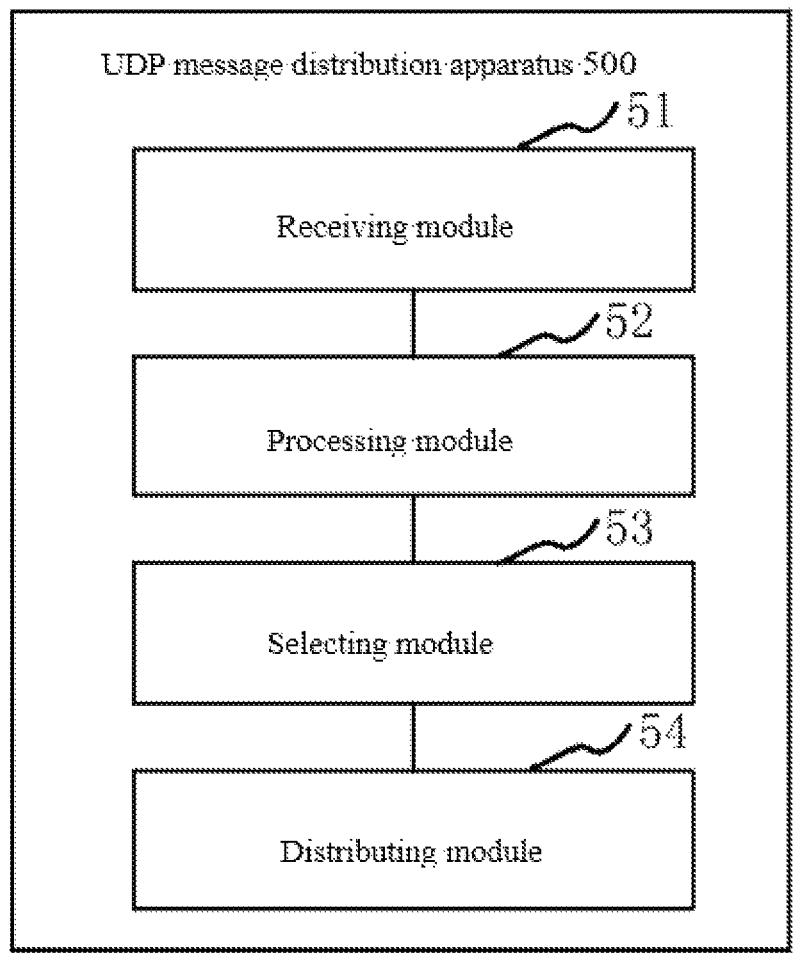
FIG. 5 is a schematic diagram of a UDP message distribution apparatus provided according to an embodiment of the present application.

FIG. 5 is a schematic diagram of a UDP message distribution apparatus provided according to an embodiment of the present application. The UDP message distribution apparatus 500 includes a transceiving module 51, a processing module 52, a selecting module 53, and a distributing module 54.

The transceiving module 51 is configured to receive a UDP message from a terminal device.

The processing module 52 is configured to determine a target process group from multiple process groups of a reuseport group according to a quadruple carried by the UDP message. The multiple process groups are multiple process groups created in a sequence for application services, and each process group in the multiple process groups has an EBPF resource independent from each other.

The selecting module 53 is configured to select a target FD from FDs of each of the multiple process of the target process group.

The distributing module 54 is configured to distribute the UDP message by using the target FD.

In an embodiment, before the target process group is determined by the processing module 52 from the multiple process groups of the reuseport group according to the quadruple carried by the UDP message, the processing module 52 is further configured to create a second process group by using the master process in response to the process group being created each time. The first process group and the second process group are two process groups created successively in the multiple process groups, and the first process group corresponds to the first group of FDs. A second group of FDs is generated for the second process group, and the second group of FDs is set to the resources to be used in a resource set to obtain an EBPF resource. The resource set is used to store pre-created resources to be used, the first number of resources to be used in the resource set is the same as the maximum number of the process groups of the reuseport group, and the second number of the process groups in the multiple process groups is less than or equal to the first number.

In an embodiment, before the second group of FDs is generated by the processing module 52 for the second process group, the processing module 52 is further configured to filter out FDs in the listening structure of the first process group in response to performing hot update on application services to create the second process group, where the first process group and the second process group are both created by the first master process.

In an embodiment, in response to the process group being created each time, the processing module 52 is further configured to store the EBPF resource of the process group created this time in the dynamic array as an element; and in response to the number of elements in the dynamic array being greater than or equal to the first number, the EBPF resource of the process group created this time is stored in the dynamic array after the elements of the early created process group are cleaned up according to the creation sequence of the process groups in the multiple process groups.

In an embodiment, before the second group of FDs is generated by the processing module 52 for the second process group, the processing module 52 is further configured to transmit environment variables to the second master process by using the first master process in response to application services being upgraded to create the second process group. The first master process is a main process before the application services are upgraded, and the second master process is a master process after the application services are upgraded. In response to the FD carrying the preset identifier existing in the environment variable, the FD carrying the preset identifier is closed.

In an embodiment, the processing module 52 is further configured to invoke the resource recovery interface to clean up the EBPF resource of the first process group in response to the process group being created each time.

In an embodiment, the processing module 52 is further configured to create a third process group by using the first master process when the application service upgrade fails. The FD in the listening structure of the third process group is closed. A third group of FDs is generated for the third process group, and an EBPF resource corresponding to the third process group is created according to the third group of FDs.

In an embodiment, the processing module 52 is further configured to determine that an abnormal process exists in the newly created process group in the multiple process groups, and create a new worker process is created for the newly created process group. A file handle of the worker process is the FD of the abnormal process.

In an embodiment, in response to the UDP port corresponding to the reuseport group being bound to at least two IP protocols, the UDP port serves at least two IP protocols at the same time.

In an embodiment, the EBPF resource is used to store information of a FD of each process in the corresponding process group, and the number of process groups in the multiple process groups is greater than or equal to 2.

According to the UDP message distribution apparatus in the embodiment of the present application, the action of the server according to the embodiments may be implemented, implementation principle and technical effect thereof are similar, and details are not described herein again.

Figure 6:
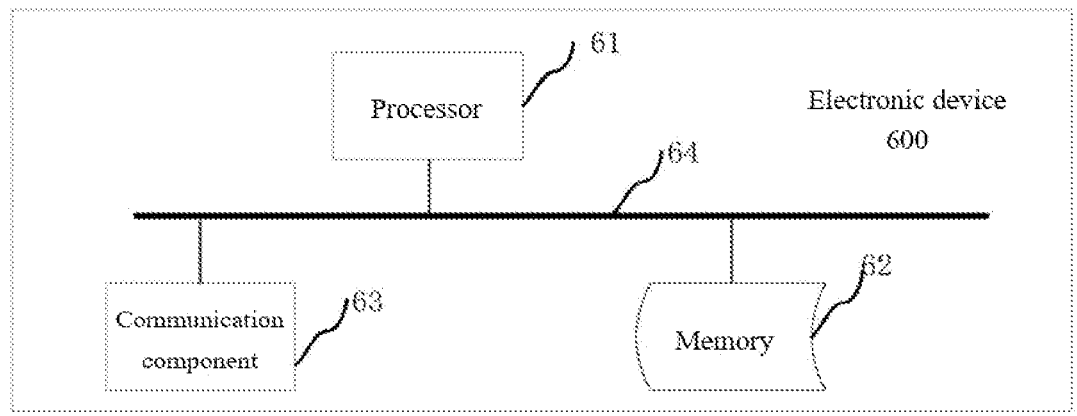
FIG. 6 is a schematic structural view of an electronic device provided according to an embodiment of the present application.

FIG. 6 is a schematic structural view of an electronic device provided according to an embodiment of the present application. As shown in FIG. 6, the electronic device 600 is, for example, a regulation center or an anti-attack node, and the electronic device 600 includes a processor 61 and a memory 62.

The memory 62 is configured to store computer instructions.

The processor 61 is configured to execute the computer instructions stored in the memory 62, so that the processor 61 executes the UDP message distribution method implemented by the server.

For the specific implementation process of the processor 61, reference is made to the method embodiment. Implementation principle and technical effect thereof are similar, and details are not described herein again.

Optionally, the electronic device 600 further includes a communication component 63. The processor 61, the memory 62, and the communication component 63 are connected via a bus 64.

A computer readable storage medium is further provided according to an embodiment of the present application. The computer readable storage medium stores computer instructions, and when executed by a processor, cause the server to implement the UDP message distribution method.

A computer program product is further provided according to an embodiment of the present application. The computer program product includes a computer program, and when executed by a processor, cause the server to implement the UDP message distribution method.

Other embodiments of the present application will be readily apparent to those skilled in the art from the consideration of the specification and the practice of the disclosed application herein. The present application aims to cover any variations, purposes or adaptive changes. These variations, purposes or adaptive changes follow the general principles of the present application, and include common general knowledge or conventional technical means in the art which is not disclosed in the present application. The specification and embodiments are merely regarded as exemplary, and the true scope and spirit of the present application are defined by the claims.

It should be understood that the present application is not limited to the exact structure that has been described above and illustrated in the accompanying drawings, and that various modifications and changes may be made without departing from the scope thereof. The scope of the present application is only limited by the appended set of claims.

The invention claimed is:

1. A user datagram protocol (UDP) message distribution method, comprising:
   receiving a UDP message from a terminal device;
   determining a target process group from a plurality of process groups of a reuseport group according to a quadruple carried by the UDP message, wherein the plurality of process groups are created in sequence for an application service, and each of the plurality of process groups has an extended Berkeley packet filter (EBPF) resource independent from each other;
   selecting a target file handle (FD) from FDs of a plurality of processes of the target process group; and
   distributing the UDP message using the target FD.

2. The UDP message distribution method according to claim 1, wherein before determining the target process group from the plurality of process groups of the reuseport group according to the quadruple carried by the UDP message, the method further comprises:
   in response to creating each of the plurality of process groups, creating, by a master process, a second process group, wherein a first process group and the second process group are created in sequence in the plurality of process groups, and the first process group corresponds to a first group of FDs;
   generating, for the second process group, a second group of FDs; and
   setting the second group of FDs to standby resources in a resource set to obtain the EBPF resource, wherein the standby resources are pre-created and stored in the resource set, a first number of the standby resources in the resource set is the same as a maximum number of the process groups of the reuseport group, and a second number of the process groups in the plurality of process groups is less than or equal to the first number.

3. The UDP message distribution method according to claim 2, wherein in before generating, for the second process group, the second group of FDs, the method further comprises:
   in response the application service being hot-updated to create the second process group, filtering out an FD in a listening structure of the first process group, wherein the first process group and the second process group are both created by a first master process.

4. The UDP message distribution method according to claim 2, further comprising:
   in response to each of the plurality of the process groups being created, storing the EBPF resource of the process group created this time in a dynamic array as an element; and
   in response to a number of the element in the dynamic array being greater than or equal to the first number, storing the EBPF resource of the process group created this time in the dynamic array after the element of the process group created at first according to the sequence in which the plurality of process groups are created.

5. The UDP message distribution method according to claim 2, wherein before generating, for the second process group, the second group of FDs, the method further comprises:
   in response to upgrading the application service to create the second process group, transferring, by a first master process, an environment variable to a second master process, wherein the first master process is a master process before the application service is upgraded, and the second master process is a master process after the application service is upgraded; and
   in response to an FD carrying a preset identifier existing in the environment variable, closing the FD carrying the preset identifier.

6. The UDP message distribution method according to claim 5, further comprising:
   in response to each of the plurality of the process groups being created, invoking a resource recovery interface to clean the EBPF resource of the first process group.

7. The UDP message distribution method according to claim 5, further comprising:
   creating, by the first master process, a third process group in response to the application services failing to be upgraded;
   closing an FD in a listening structure of the third process group;
   generating, for the third process group, a third group of FDs; and
   creating the EBPF resource corresponding to the third process group according to the third group of FDs.

8. The UDP message distribution method according to claim 1, further comprising:
   determining that an abnormal process exists in a process group newly created in the plurality of process groups; and
   creating, for the newly created process group, a new worker process, wherein an FD of the worker process is an FD of the abnormal process.

9. The UDP message distribution method according to claim 1, wherein in response to a plurality of IP protocols being bound on a UDP port corresponding to the reuseport group, the UDP port simultaneously serves the plurality of IP protocols.

10. The UDP message distribution method according to claim 1, wherein the EBPF resource is configured to store information of a file handle of an FD of each process in a corresponding process group.

11. An electronic device, comprising a processor, a memory, wherein a computer program is stored on the memory and is operatable on the processor, the computer program, when being executed by the processor, causes the electronic device to implements the method according to claim 1.

12. The electronic device according to claim 11, further comprising a communication component and a bus, wherein the processor, the memory, and the communication component are connected via the bus.

13. A non-transitory computer readable storage medium storing therein a computer program, wherein the computer program, when being executed by a processor, causes the method according to claim 1 to be implemented.

14. A user datagram protocol (UDP) message distribution apparatus, comprising at least one processor and memory storing therein computer program instructions, which, when executed by the at least one processor, cause the at least one processor to provide software modules including:
 a receiving module configured to receive a UDP message from a terminal device;
 a processing module configured to determine a target process group from a plurality of process groups of a reuseport group according to a quadruple carried by the UDP message, wherein the plurality of process groups are created in sequence for an application service, and each of the plurality of process groups has an EBPF resource independent from each other;
 a selecting module configured to select a target FD from FDs of a plurality of processes of the target process group; and
 a distributing module configured to distribute the UDP message using the target FD.

15. The UDP message distribution apparatus according to claim 14, wherein before the target process group is determined by the processing module from the multiple process groups of the reuseport group according to the quadruple carried by the UDP message, the processing module is further configured to create, by a master process, a second process group in response to creating each of the plurality of process groups, and generate a second group of FDs for the second process group, wherein a first process group and the second process group are created in sequence in the plurality of process groups, and the first process group corresponds to a first group of FDs.

16. The UDP message distribution apparatus according to claim 15, wherein before the second group of FDs is generated by the processing module for the second process group, the processing module is further configured to filter out FDs in a listening structure of the first process group, and the first process group and the second process group are both created by a first master process.

17. The UDP message distribution apparatus according to claim 14, wherein in response to the process group being created each time, the processing module is further configured to store the EBPF resource of a process group created this time in a dynamic array as an element, and in response to a number of the element in the dynamic array being greater than or equal to the first number, store the EBPF resource of the process group created this time in the dynamic array after the element of the process group created at first according to the sequence in which the plurality of process groups are created.

18. The UDP message distribution apparatus according to claim 14, wherein the processing module is further configured to invoke a resource recovery interface to clean the EBPF resource of the first process group in response to each of the plurality of the process groups being created.

19. The UDP message distribution apparatus according to claim 14, wherein the processing module is further configured to create, by the first master process, a third process group in response to the application service failing to be upgraded.

20. The UDP message distribution apparatus according to claim 14, wherein the processing module is further configured to determine that an abnormal process exists in the newly created process group in the multiple process groups, and create a new worker process is created for the newly created process group.

\* \* \* \* \*